US012724379B2

(12) United States Patent
Horie

(10) Patent No.: US 12,724,379 B2
(45) Date of Patent: Sep. 1, 2026

(54) TONER CONTAINER CAPABLE OF FACILITATING CLEANING TASK BEFORE REUSE, IMAGE FORMING APPARATUS, AND MANUFACTURING METHOD OF TONER CONTAINER

(71) Applicant: KYOCERA Document Solutions Inc., Osaka (JP)

(72) Inventor: Akira Horie, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 193 days.

(21) Appl. No.: 18/669,786

(22) Filed: May 21, 2024

(65) Prior Publication Data

US 2024/0393730 A1 Nov. 28, 2024

(30) Foreign Application Priority Data

May 23, 2023 (JP) ................................ 2023-084352

(51) Int. Cl.
*G03G 21/12* (2006.01)
*G03G 15/08* (2006.01)

(52) U.S. Cl.
CPC ......... *G03G 21/12* (2013.01); *G03G 15/0867* (2013.01); *G03G 15/0881* (2013.01); *G03G 15/0886* (2013.01)

(58) Field of Classification Search
CPC ........... G03G 15/0867; G03G 15/0881; G03G 21/12; G03G 15/0886
See application file for complete search history.

(56) References Cited

U.S. PATENT DOCUMENTS

2013/0216289 A1 8/2013 Tojo
2015/0338775 A1* 11/2015 Hosokawa ............ G03G 15/08
399/258

FOREIGN PATENT DOCUMENTS

JP 2013167839 A 8/2013

* cited by examiner

*Primary Examiner* — Joseph S Wong
(74) *Attorney, Agent, or Firm* — Alleman Hall LLP

(57) ABSTRACT

A toner container includes a cylindrical portion, an opening portion, a shutter portion, a bias portion and a lock portion. The cylindrical portion is formed in a cylindrical shape elongated in an insertion direction with respect to an image forming apparatus. The opening portion is provided at an outer circumferential portion of the cylindrical portion. The shutter portion is provided to be movable between a cover position at which the shutter portion covers the opening portion on an outer side of the cylindrical portion and an evacuation position evacuated from the cover position toward an upstream side of the insertion direction. The bias portion biases the shutter portion in the insertion direction. The lock portion locks the shutter portion at the evacuation position.

5 Claims, 15 Drawing Sheets

TONER CONTAINER CAPABLE OF FACILITATING CLEANING TASK BEFORE REUSE, IMAGE FORMING APPARATUS, AND MANUFACTURING METHOD OF TONER CONTAINER

INCORPORATION BY REFERENCE

This application is based upon and claims the benefit of priority from the corresponding Japanese Patent Application No. 2023-084352 filed on May 23, 2023, the entire contents of which are incorporated herein by reference.

BACKGROUND

The present disclosure relates to an image forming apparatus that uses electrophotography, a toner container provided in the image forming apparatus, and a manufacturing method of the toner container.

An image forming apparatus that uses electrophotography includes a waste toner container which stores waste toner recovered from an image-carrying member after transfer of a toner image. For example, the waste toner container includes a cylindrical portion, an opening portion, a shutter portion, and a bias portion. The cylindrical portion is formed in a cylindrical shape that is elongated in an insertion direction with respect to the image forming apparatus. The opening portion is provided at an outer circumferential portion of the cylindrical portion and is arranged opposed to a waste toner discharge port in the image forming apparatus. The shutter portion is provided to be movable between a cover position at which the shutter portion covers the opening portion on an outer side of the cylindrical portion and an evacuation position evacuated from the cover position toward an upstream side of the insertion direction. The bias portion biases the shutter portion in the insertion direction.

SUMMARY

A toner container according to an aspect of the present disclosure includes a cylindrical portion, an opening portion, a shutter portion, a bias portion and a lock portion. The cylindrical portion is formed in a cylindrical shape elongated in an insertion direction with respect to an image forming apparatus. The opening portion is provided at an outer circumferential portion of the cylindrical portion. The shutter portion is provided to be movable between a cover position at which the shutter portion covers the opening portion on an outer side of the cylindrical portion and an evacuation position evacuated from the cover position toward an upstream side of the insertion direction. The bias portion biases the shutter portion in the insertion direction. The lock portion locks the shutter portion at the evacuation position.

An image forming apparatus according to another aspect of the present disclosure includes the toner container.

A manufacturing method of a toner container according to another aspect of the present disclosure is a manufacturing method of a toner container including a cylindrical portion formed in a cylindrical shape elongated in an insertion direction with respect to an image forming apparatus, an opening portion provided at an outer circumferential portion of the cylindrical portion, a shutter portion provided to be movable between a cover position at which the shutter portion covers the opening portion on an outer side of the cylindrical portion and an evacuation position evacuated from the cover position toward an upstream side of the insertion direction, a compression coil spring which encloses an outer circumference of the cylindrical portion at a position more on the upstream side of the insertion direction than the shutter portion and biases the shutter portion in the insertion direction, a lock portion which locks the shutter portion at the evacuation position, and a sealing portion which is provided along an edge portion of the opening portion and fills a gap between the shutter portion arranged at the cover position and the opening portion, and includes a first step, a second step, a third step, and a fourth step. The first step includes attaching the compression coil spring to the cylindrical portion. The second step includes attaching the shutter portion after the first step. The third step includes locking the shutter portion at the evacuation position using the lock portion. The fourth step includes attaching the sealing portion after the third step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an example of embodying the present disclosure and does not limit the technical scope of the present disclosure.

[Configuration of Image Forming Apparatus 100]

First, a configuration of an image forming apparatus 100 according to an embodiment of the present disclosure will be described with reference to FIG. 1. Herein, FIG. 1 is a cross-sectional view showing the configuration of the image forming apparatus 100.

It is noted that for convenience of descriptions, a vertical direction in a state where the image forming apparatus 100 is installed in a usable state (a state shown in FIG. 1) is defined as an up-down direction D1. In addition, a front-rear direction D2 is defined with a surface of the image forming apparatus 100 on a near side of a sheet surface shown in FIG. 1 being a front surface (front side). In addition, a left-right direction D3 is defined using the front surface of the image forming apparatus 100 in the installed state as a reference. The front-rear direction D2 and the left-right direction D3 are directions along a horizontal plane.

The image forming apparatus 100 has a printing function for forming an image on a sheet using electrophotography. Specifically, the image forming apparatus 100 is a multifunction peripheral having a plurality of functions including the printing function. It is noted that the image forming apparatus 100 may alternatively be a printer, a facsimile apparatus, a copying machine, or the like having the printing function.

Figure 1:
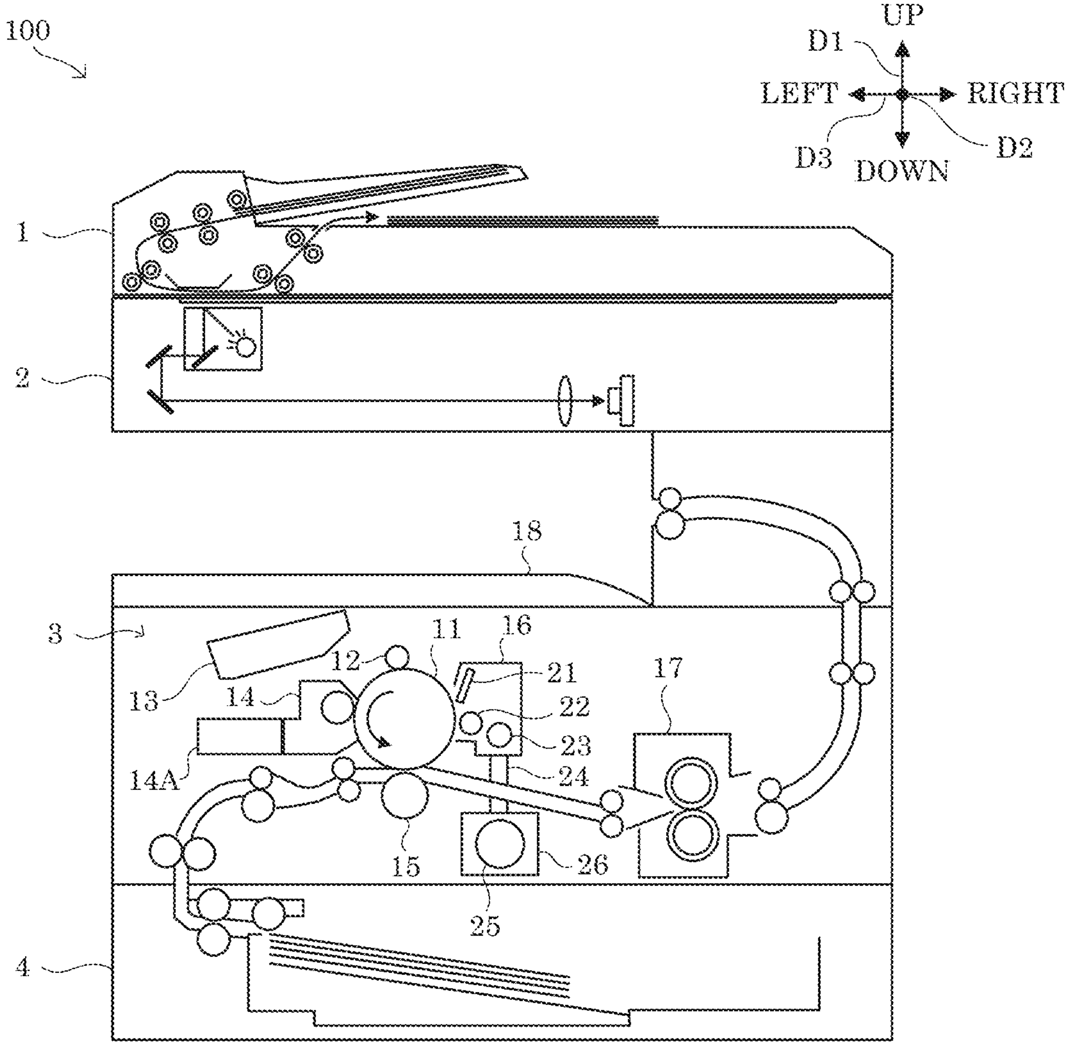
FIG. 1 is a diagram showing a configuration of an image forming apparatus according to an embodiment of the present disclosure.

As shown in FIG. 1, the image forming apparatus 100 includes an ADF (Auto Document Feeder) 1, an image reading portion 2, an image forming portion 3, and a sheet feed portion 4.

The ADF 1 conveys a document sheet from which an image is to be read by the image reading portion 2. The ADF 1 includes a document sheet setting portion, a plurality of conveying rollers, a document sheet holder, and a sheet discharge portion.

The image reading portion 2 realizes a scanning function for reading an image from the document sheet. The image reading portion 2 includes a document sheet table, a light source, a plurality of mirrors, an optical lens, and a CCD (Charge Coupled Device). The image reading portion 2 reads an image from the document sheet conveyed by the ADF 1 and outputs image data corresponding to the read image. In addition, the image reading portion 2 reads an image from the document sheet placed on the document sheet table and outputs image data corresponding to the read image.

The image forming portion 3 realizes the printing function.

As shown in FIG. 1, the image forming portion 3 includes a photoconductor drum 11, a charging device 12, a laser scanning unit 13, a developing device 14, a transfer roller 15, a cleaning device 16, a fixing device 17, and a sheet discharge tray 18.

The photoconductor drum 11 is rotatably supported by a housing of the image forming apparatus 100. The photoconductor drum 11 rotates in a direction indicated by an arrow shown in FIG. 1 upon receiving a rotational driving force transmitted from a motor (not shown).

The charging device 12 charges a surface of the photoconductor drum 11.

The laser scanning unit 13 emits light that is based on image data toward the surface of the photoconductor drum 11 that has been charged by the charging device 12. By the laser scanning unit 13, an electrostatic latent image is formed on the surface of the photoconductor drum 11.

The developing device 14 uses developer including toner to develop the electrostatic latent image formed on the surface of the photoconductor drum 11. By the developing device 14, a toner image is formed on the surface of the photoconductor drum 11. As shown in FIG. 1, a toner container member 14A is connected to the developing device 14. The toner container member 14A stores toner to be supplied to the developing device 14.

The transfer roller 15 transfers the toner image formed on the surface of the photoconductor drum 11 onto a sheet conveyed by the sheet feed portion 4.

The cleaning device 16 cleans the surface of the photoconductor drum 11 after the toner image is transferred by the transfer roller 15. Specifically, the cleaning device 16 includes a cleaning member 21, a grinding roller 22, and a conveying screw 23 shown in FIG. 1. The cleaning member 21 is a blade-like member that removes toner remaining on the surface of the photoconductor drum 11. The grinding roller 22 causes the toner removed from the surface of the photoconductor drum 11 by the cleaning member 21 to adhere onto a surface thereof to grind the surface of the photoconductor drum 11. The conveying screw 23 conveys the toner removed by the cleaning member 21 to a back side of the image forming apparatus 100 along the front-rear direction D2. The toner conveyed to the back side of the image forming apparatus 100 by the conveying screw 23 is discharged to a waste toner container 25 (see FIG. 1) via a waste toner discharge path 24 (see FIG. 1) that extends in the vertical direction from the cleaning device 16.

The waste toner container 25 stores waste toner recovered from the photoconductor drum 11 after transfer of the toner image. The waste toner container 25 is elongated in the front-rear direction D2. A container attachment portion 26 to which the waste toner container 25 is to be attached is provided inside the image forming apparatus 100. The container attachment portion 26 forms a storage space of the waste toner container 25 elongated in the front-rear direction D2. An openable/closable cover member (not shown) is provided on a front side of the container attachment portion 26. The cover member forms a part of the front surface of the image forming apparatus 100. When the cover member is opened, the waste toner container 25 attached to the container attachment portion 26 is exposed to the outside. In a state where the cover member is opened, the waste toner container 25 is inserted/removed into/from the container attachment portion 26 along the front-rear direction D2. Specifically, the waste toner container 25 is inserted into the container attachment portion 26 in an insertion direction D4 (see FIG. 2) from the front side toward the back side of the image forming apparatus 100. In addition, the waste toner container 25 is drawn out from the container attachment portion 26 in an opposite direction from the insertion direction D4. The waste toner container 25 is an example of a toner container according to the present disclosure.

The fixing device 17 fixes the toner image transferred onto the sheet to the sheet.

The sheet onto which the toner image has been fixed by the fixing device 17 is discharged onto the sheet discharge tray 18.

The sheet feed portion 4 supplies sheets to the image forming portion 3.

[Configuration of Waste Toner Container 25]

Figure 2:
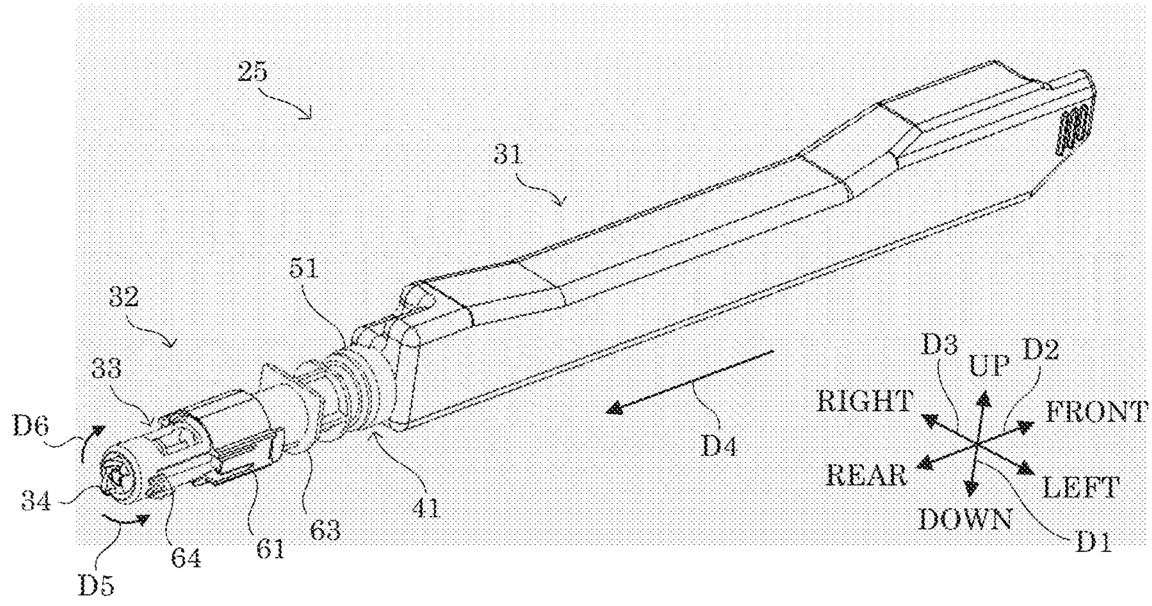
FIG. 2 is a diagram showing a configuration of a waste toner container according to the embodiment of the present disclosure.

Next, a configuration of the waste toner container 25 according to the embodiment of the present disclosure will be described with reference to FIG. 1 and FIG. 2. Herein, FIG. 2 is a perspective view showing the configuration of the waste toner container 25. It is noted that in FIG. 2, illustrations of a compression coil spring 62 and a sealing portion 65 are omitted.

As shown in FIG. 2, the waste toner container 25 includes a first storage portion 31, a second storage portion 32, an opening portion 33, and a coupling portion 34.

The first storage portion 31 is formed to be elongated in the insertion direction D4 with respect to the image forming apparatus 100 along the horizontal plane. Specifically, as shown in FIG. 2, the first storage portion 31 is formed substantially in a quadratic prism shape that is elongated in the insertion direction D4. The first storage portion 31 is formed to be hollow inside. The first storage portion 31 stores the waste toner (an example of toner according to the present disclosure). For example, the first storage portion 31 is formed of a resin material such as a synthetic resin.

The second storage portion 32 is formed to be elongated in the insertion direction D4. Specifically, as shown in FIG. 2, the second storage portion 32 is formed in a cylindrical shape elongated in the insertion direction D4. The second storage portion 32 stores the waste toner. For example, the second storage portion 32 is formed of a resin material such as a synthetic resin. The second storage portion 32 is an example of a cylindrical portion according to the present disclosure.

The first storage portion 31 and the second storage portion 32 are provided next to each other along the insertion direction D4. The second storage portion 32 is provided more on a downstream side of the insertion direction D4 than the first storage portion 31. An internal space of the second storage portion 32 is in communication with an internal space of the first storage portion 31. The first storage portion 31 and the second storage portion 32 form a waste toner storage space of the waste toner container 25 elongated in the insertion direction D4.

The opening portion 33 is provided at an outer circumferential portion of the second storage portion 32. Specifically, as shown in FIG. 2, the opening portion 33 is opened upwardly in the vertical direction in the second storage portion 32. The opening portion 33 is provided in the vicinity of an end portion of the second storage portion 32 in the insertion direction D4. The opening portion 33 causes the waste toner discharge path 24 (see FIG. 1) in the image forming apparatus 100, that extends downwardly in the vertical direction, and the inside of the second storage portion 32 to be in communication with each other. In other words, when the waste toner container 25 is attached to the container attachment portion 26, the opening portion 33 is provided opposed to a waste toner discharge port of the waste toner discharge path 24.

The waste toner container 25 includes a conveying screw (not shown) elongated in the insertion direction D4. The conveying screw is provided inside the waste toner container 25. The conveying screw conveys the waste toner discharged to the inside of the second storage portion 32 via the opening portion 33 to the first storage portion 31 side.

When the waste toner container 25 is attached to the container attachment portion 26, the coupling portion 34 is coupled with a driving shaft (not shown) which rotates by a rotational driving force transmitted from a motor (not shown) provided inside the image forming apparatus 100. As shown in FIG. 2, the coupling portion 34 is provided at a tip end portion of the second storage portion 32 in the insertion direction D4. By being coupled with the driving shaft, the coupling portion 34 transmits the rotational driving force transmitted from the motor to the conveying screw.

Incidentally, as the related art, there is known a waste toner container including a discharge port used for discharging the waste toner and a lid member which seals the discharge port.

Herein, when reusing the waste toner container 25, the waste toner container 25 is cleaned as an advance preparation therefor. However, in the waste toner container according to the related art, since the waste toner in the waste toner container is discharged from the discharge port, it takes time to perform a task of removing the waste toner from inside the waste toner container.

In contrast, in the waste toner container 25 according to the embodiment of the present disclosure, it is possible to shorten a time required for the cleaning task before reuse as will be described below.

Specifically, in the waste toner container 25, the second storage portion 32 is detachably provided with respect to the first storage portion 31.

Figure 3:
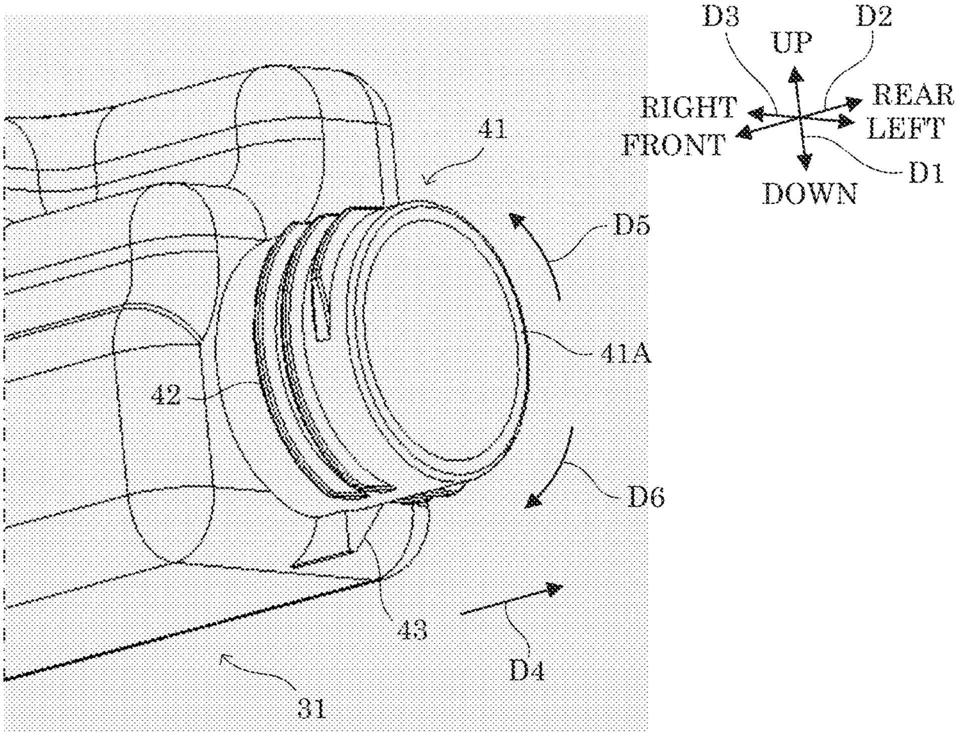
FIG. 3 is a diagram showing a configuration of a protrusion portion of the waste toner container according to the embodiment of the present disclosure.

More specifically, the waste toner container 25 includes a protrusion portion 41 shown in FIG. 3. The waste toner container 25 further includes a to-be-attached portion 51 shown in FIG. 4.

[Configurations of Protrusion Portion 41 and to-be-Attached Portion 51]

Figure 4:
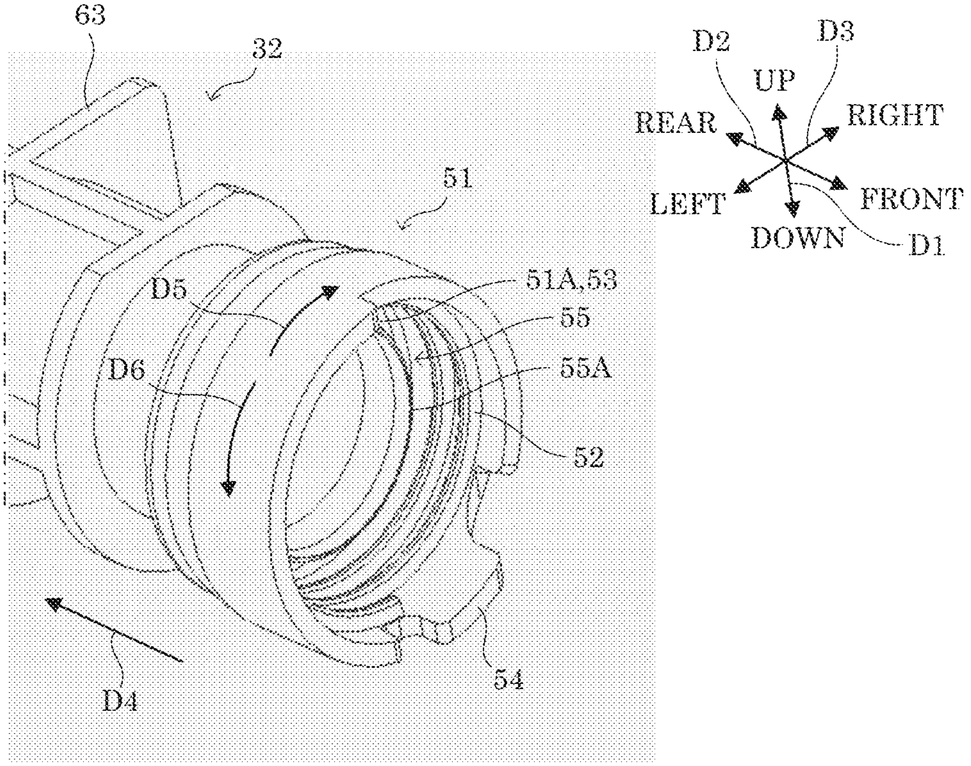
FIG. 4 is a diagram showing a configuration of a to-be-attached portion of the waste toner container according to the embodiment of the present disclosure.
Figure 5:
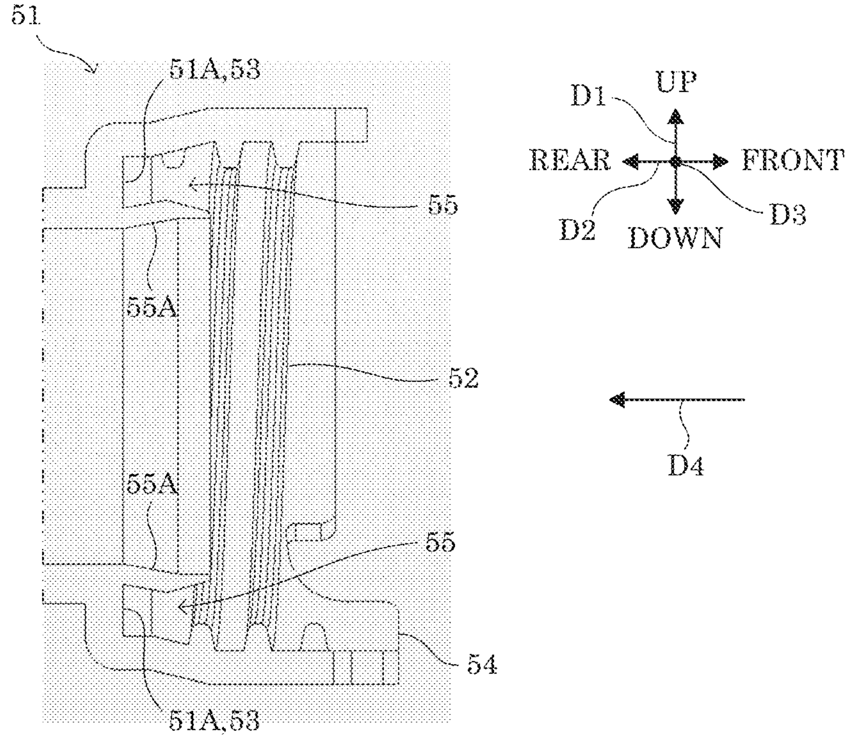
FIG. 5 is a diagram showing the configuration of the to-be-attached portion of the waste toner container according to the embodiment of the present disclosure.
Figure 6:
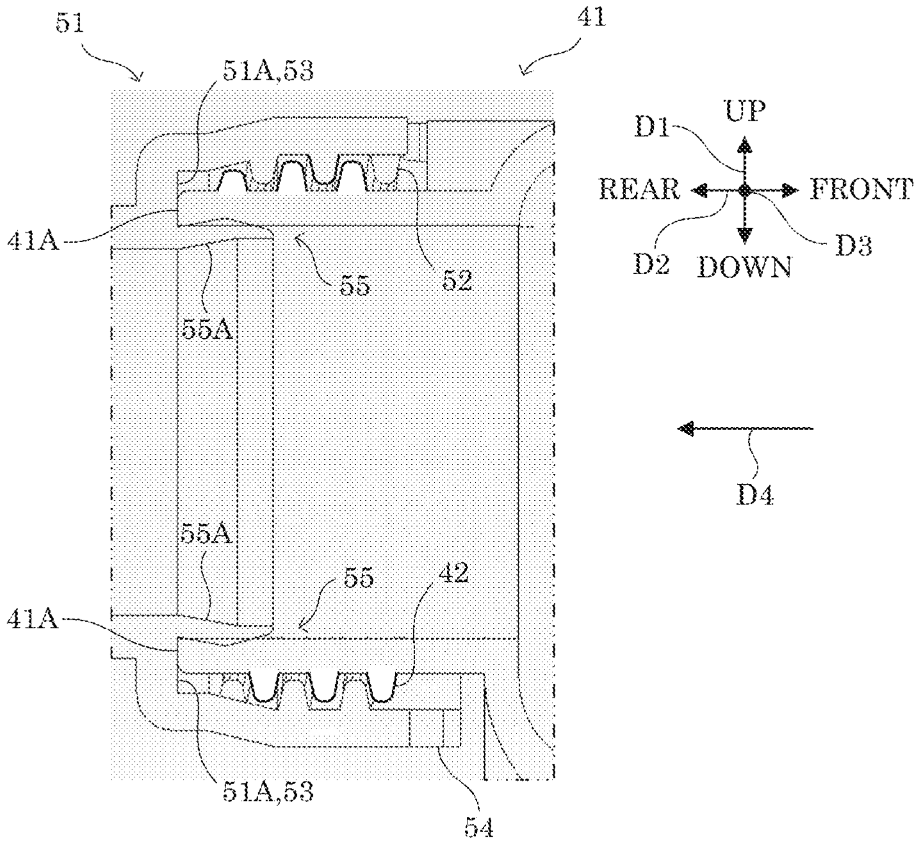
FIG. 6 is a diagram showing the configurations of the protrusion portion and the to-be-attached portion of the waste toner container according to the embodiment of the present disclosure.
Figure 7:
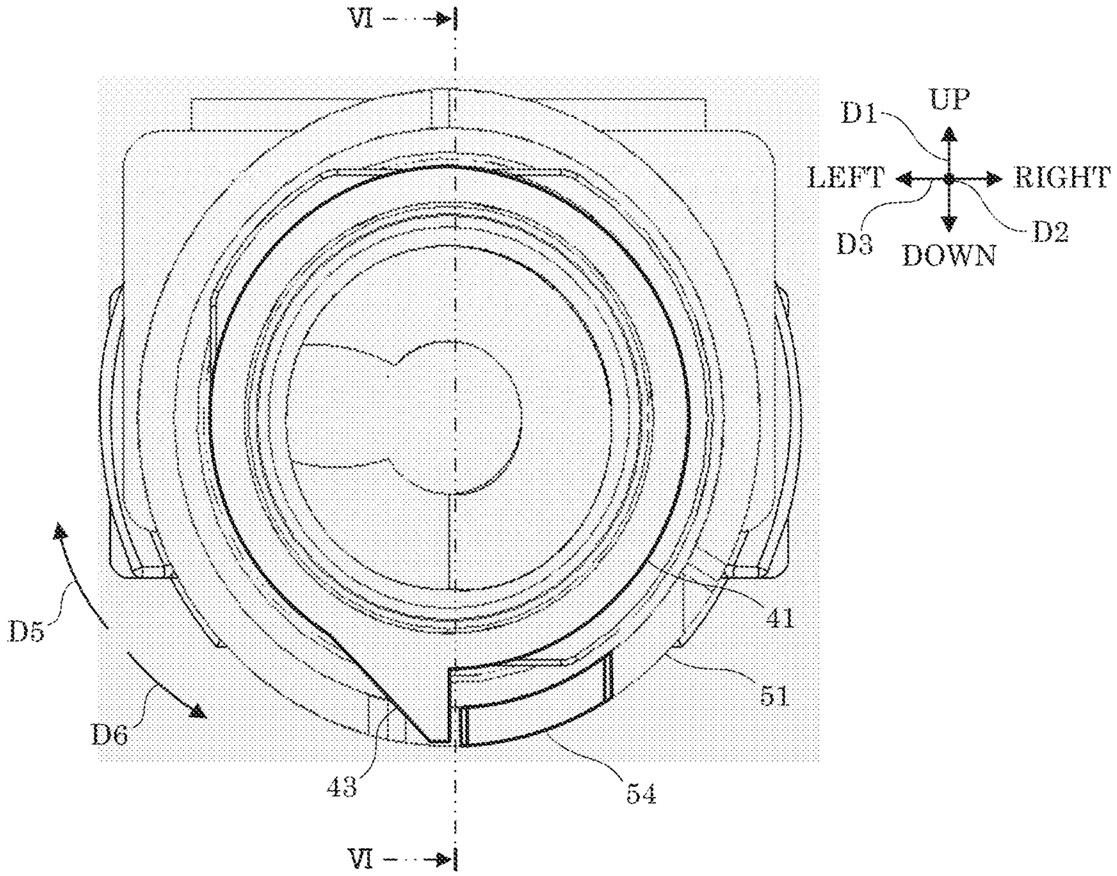
FIG. 7 is a diagram showing the configurations of the protrusion portion and the to-be-attached portion of the waste toner container according to the embodiment of the present disclosure.

Next, configurations of the protrusion portion 41 and the to-be-attached portion 51 will be described with reference to FIG. 2 to FIG. 7. Herein, FIG. 3 is a perspective view showing the configuration of the protrusion portion 41 in a state where the to-be-attached portion 51 is removed. Further, FIG. 4 is a perspective view showing the configuration of the to-be-attached portion 51 in a state where the to-be-attached portion 51 is removed from the protrusion portion 41. Furthermore, FIG. 5 is a cross-sectional view showing the configuration of the to-be-attached portion 51 in the state where the to-be-attached portion 51 is removed from the protrusion portion 41, the cross-sectional view taken along a plane orthogonal to the left-right direction D3. Further, FIG. 6 is a cross-sectional view showing the configuration of the to-be-attached portion 51 in the state where the to-be-attached portion 51 is attached to the protrusion portion 41, the cross-sectional view taken along the plane orthogonal to the left-right direction D3. Furthermore, FIG. 7 is a cross-sectional view showing the configuration of the to-be-attached portion 51 in the state where the to-be-attached portion 51 is attached to the protrusion portion 41, the cross-sectional view taken along a plane orthogonal to the front-rear direction D2. FIG. 6 is a cross-sectional view taken along VI-VI indicated by arrows in FIG. 7.

The protrusion portion 41 protrudes in a cylindrical shape in the insertion direction D4 from an end portion of the first storage portion 31 in the insertion direction D4. Specifically, as shown in FIG. 3, the protrusion portion 41 is formed in the cylindrical shape protruding in the insertion direction D4 from a wall surface at a tip end of the first storage portion 31 in the insertion direction D4. The protrusion portion 41 is opened toward the insertion direction D4. The protrusion portion 41 causes the internal space of the first storage portion 31 to be in communication with the outside. The protrusion portion 41 is formed integrally with the first storage portion 31.

The to-be-attached portion 51 is provided at an end portion of the second storage portion 32 on an upstream side of the insertion direction D4. The to-be-attached portion 51 is formed in a cap shape that covers an opening portion and outer circumferential portion of the protrusion portion 41. In other words, the to-be-attached portion 51 is formed in a cylindrical shape that has an inner diameter larger than an outer diameter of the protrusion portion 41, and a downstream side thereof in the insertion direction D4 is blocked by a wall-type blocking portion 51A (see FIG. 5). The second storage portion 32 is formed to protrude in a cylindrical shape in the insertion direction D4 from the blocking portion 51A of the to-be-attached portion 51. The to-be-attached portion 51 causes the internal space of the second storage portion 32 to be in communication with the outside. The to-be-attached portion 51 is formed integrally with the second storage portion 32. The second storage portion 32 and the to-be-attached portion 51 are an example of a second storage portion according to the present disclosure.

As shown in FIG. 3, the protrusion portion 41 includes a male screw portion 42. The male screw portion 42 is provided at an outer circumferential portion of the protrusion portion 41. Specifically, the male screw portion 42 forms a spiral screw thread at the outer circumferential portion of the protrusion portion 41.

As shown in FIG. 4, the to-be-attached portion 51 includes a female screw portion 52. The female screw portion 52 is provided at an inner circumferential portion of the to-be-attached portion 51. Specifically, the female screw portion 52 forms a spiral screw thread at the inner circumferential portion of the to-be-attached portion 51. The female screw portion 52 screws together with the male screw portion 42. In other words, in the waste toner container 25, the to-be-attached portion 51 functions as a screw cap with respect to the protrusion portion 41. The second storage portion 32 extends in the insertion direction D4 from the protrusion portion 41 in a state where the to-be-attached portion 51 is coupled with the protrusion portion 41.

A cleaning worker who performs the cleaning task of the waste toner container 25 rotates the to-be-attached portion 51 in a first rotation direction D5 (see FIG. 2 and FIG. 4) with respect to the protrusion portion 41 and releases the screwed state of the male screw portion 42 and the female screw portion 52 so that the to-be-attached portion 51 and the second storage portion 32 can be separated from the protrusion portion 41 and the first storage portion 31. Thus, the cleaning worker is capable of discharging the waste toner stored inside the second storage portion 32 from an opening end portion of the to-be-attached portion 51 on the upstream side of the insertion direction D4, and also discharging the waste toner stored inside the first storage portion 31 from an opening end portion of the protrusion portion 41 on the downstream side of the insertion direction D4. Accordingly, in the waste toner container 25, the waste toner can be removed in a shorter time than in the waste toner container according to the related art.

In addition, after ending the cleaning of the waste toner container 25, the cleaning worker rotates the to-be-attached portion 51 in a second rotation direction D6 (see FIG. 2 to FIG. 4) opposite to the first rotation direction D5 with respect to the protrusion portion 41 and screws together the male screw portion 42 and the female screw portion 52 so that the to-be-attached portion 51 and the second storage portion 32 can be coupled with the protrusion portion 41 and the first storage portion 31.

Herein, the waste toner container 25 includes a first latch portion 53, a second latch portion 43, and a groove portion 55.

The first latch portion 53 latches forward screwing of the second storage portion 32 with respect to the first storage portion 31 at a specific forward screwing amount with which the opening portion 33 faces upwardly in the vertical direction with respect to the first storage portion 31 in an insertion attitude insertable into the image forming apparatus 100 (see FIG. 2).

It is noted that the "forward screwing" refers to a movement of the second storage portion 32 toward the upstream side of the insertion direction D4, that is caused by the rotation of the second storage portion 32 in the second rotation direction D6 with respect to the first storage portion 31 in a state where the male screw portion 42 and the female screw portion 52 are screwed together.

In other words, the first latch portion 53 latches the rotation of the second storage portion 32 in the second rotation direction D6 with respect to the first storage portion 31 in the state where the male screw portion 42 and the female screw portion 52 are screwed together at a timing at which the opening portion 33 faces upwardly in the vertical direction with respect to the first storage portion 31 in the insertion attitude.

Specifically, as shown in FIG. 4 to FIG. 6, the first latch portion 53 is the blocking portion 51A of the to-be-attached portion 51. In other words, the forward screwing of the second storage portion 32 with respect to the first storage portion 31 is latched by the blocking portion 51A of the to-be-attached portion 51 and a protrusion end portion 41A of the protrusion portion 41 (see FIG. 3 and FIG. 6) coming into contact with each other.

Thus, the cleaning worker can couple the first storage portion 31 and the second storage portion 32 with each other such that the opening portion 33 faces upwardly in the vertical direction with respect to the first storage portion 31 in the insertion attitude without adjusting a rotation amount of the second storage portion 32 with respect to the first storage portion 31. Accordingly, the coupling task of the first storage portion 31 and the second storage portion 32 can be simplified.

It is noted that the first latch portion 53 may come into contact with an end portion of the male screw portion 42 on the downstream side of the insertion direction D4 at the inner circumferential portion of the to-be-attached portion 51, to latch the forward screwing of the second storage portion 32 with respect to the first storage portion 31. Alternatively, the first latch portion 53 may come into contact with an end portion of the female screw portion 52 on the upstream side of the insertion direction D4 at the outer circumferential portion of the protrusion portion 41, to latch the forward screwing of the second storage portion 32 with respect to the first storage portion 31.

The second latch portion 43 latches backward screwing of the second storage portion 32 with respect to the first storage portion 31, the second storage portion 32 having been forwardly screwed with respect to the first storage portion 31 by the specific forward screwing amount.

It is noted that the "backward screwing" refers to a movement of the second storage portion 32 toward the downstream side of the insertion direction D4, that is caused by the rotation of the second storage portion 32 in the first rotation direction D5 with respect to the first storage portion 31 in the state where the male screw portion 42 and the female screw portion 52 are screwed together.

Specifically, as shown in FIG. 3, the second latch portion 43 is provided at the outer circumferential portion of the protrusion portion 41. As shown in FIG. 3 and FIG. 7, the second latch portion 43 is formed in a claw shape that protrudes outwardly in a radial direction of the protrusion portion 41 from the outer circumferential portion of the protrusion portion 41.

Moreover, as shown in FIG. 4, the to-be-attached portion 51 includes a to-be-latched piece 54 that engages with the second latch portion 43. The to-be-latched piece 54 is provided at the opening end portion of the to-be-attached portion 51 on the upstream side of the insertion direction D4. The to-be-latched piece 54 is formed such that a part of the opening end portion of the to-be-attached portion 51 protrudes toward the upstream side of the insertion direction D4.

The to-be-latched piece 54 engages with the second latch portion 43 (see FIG. 7) as the second storage portion 32 is forwardly screwed by the specific forward screwing amount with respect to the first storage portion 31. Specifically, by the second storage portion 32 being rotated in the second rotation direction D6 with respect to the first storage portion 31, the to-be-latched piece 54 comes into contact with the second latch portion 43 and engages with the second latch portion 43 by snap-fit. As shown in FIG. 7, the to-be-latched piece 54 engaged with the second latch portion 43 is arranged more on the downstream side of the second rotation direction D6 than the second latch portion 43. Thus, the rotation of the to-be-latched piece 54 in the first rotation direction D5 is latched by the second latch portion 43. Therefore, the rotation of the second storage portion 32 in the first rotation direction D5 with respect to the first storage portion 31 is latched. In other words, the backward screwing of the second storage portion 32 with respect to the first storage portion 31 is latched. When the to-be-latched piece 54 and the second latch portion 43 are engaged with each other, the coupled state of the first storage portion 31 and the second storage portion 32 will not be released as long as a rotational force with which the engagement can be released is not applied. It is noted that during the cleaning task of the waste toner container 25, the worker can apply a rotational force with which the engagement between the to-be-latched piece 54 and the second latch portion 43 can be released to the second storage portion 32, to thus release the coupled state of the first storage portion 31 and the second storage portion 32.

The protrusion end portion 41A of the protrusion portion 41 (see FIG. 3 and FIG. 6) is pressed into the groove portion 55 in accordance with the forward screwing of the second storage portion 32 with respect to the first storage portion 31. The groove portion 55 is annular.

Specifically, as shown in FIG. 5, the groove portion 55 is formed by the inner circumferential portion, the blocking portion 51A, and a pressing piece 55A in the to-be-attached portion 51. The pressing piece 55A is formed in a cylindrical shape that protrudes toward the upstream side of the insertion direction D4 from the blocking portion 51A. The pressing piece 55A is formed such that it opens wider as it comes nearer to the upstream side of the insertion direction D4. The pressing piece 55A presses the protrusion end portion 41A of the protrusion portion 41 inserted into the gap formed between the pressing piece 55A and the inner circumferential portion of the to-be-attached portion 51 toward the outer side of the radial direction.

By pressing the protrusion end portion 41A of the protrusion portion 41 into the groove portion 55, a situation where the waste toner enters a contact portion between the protrusion portion 41 and the to-be-attached portion 51 is suppressed. Therefore, leakage of the waste toner via the contact portion between the protrusion portion 41 and the to-be-attached portion 51 is suppressed.

[Configuration of Second Storage Portion 32]

Figure 8:
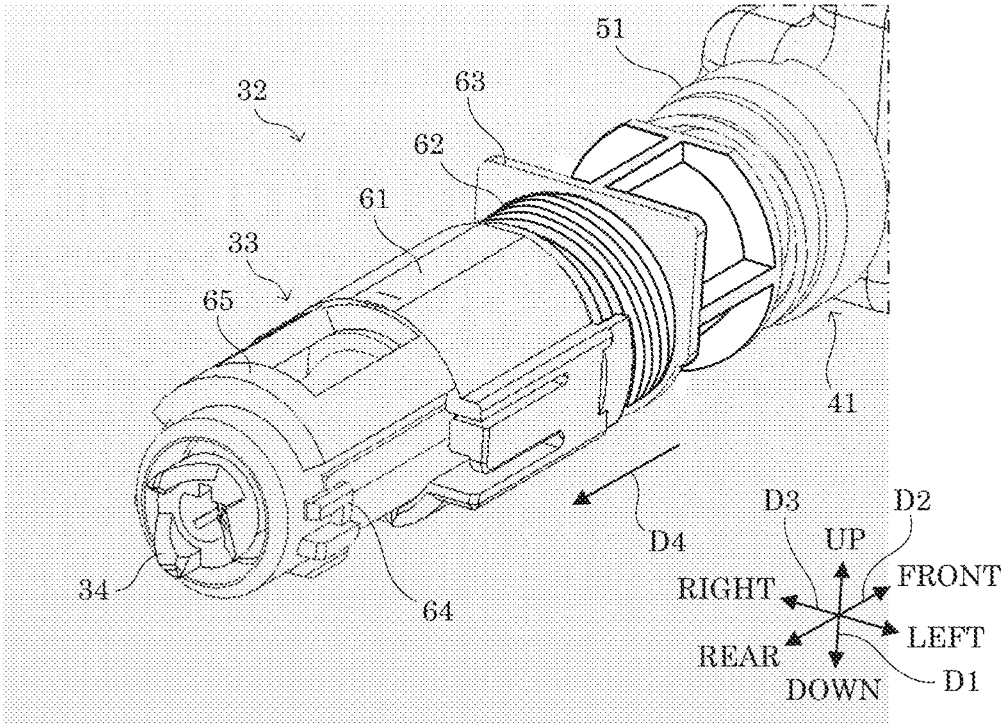
FIG. 8 is a diagram showing a configuration of a second storage portion of the waste toner container according to the embodiment of the present disclosure.
Figure 9:
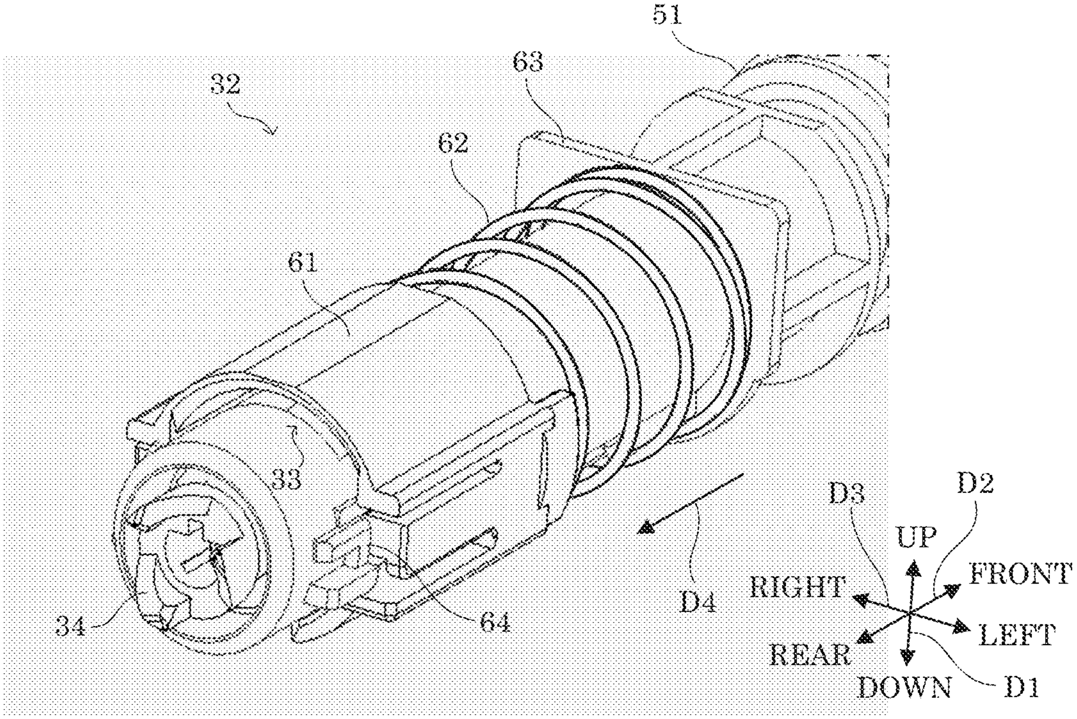
FIG. 9 is a diagram showing the configuration of the second storage portion of the waste toner container according to the embodiment of the present disclosure.
Figure 10:
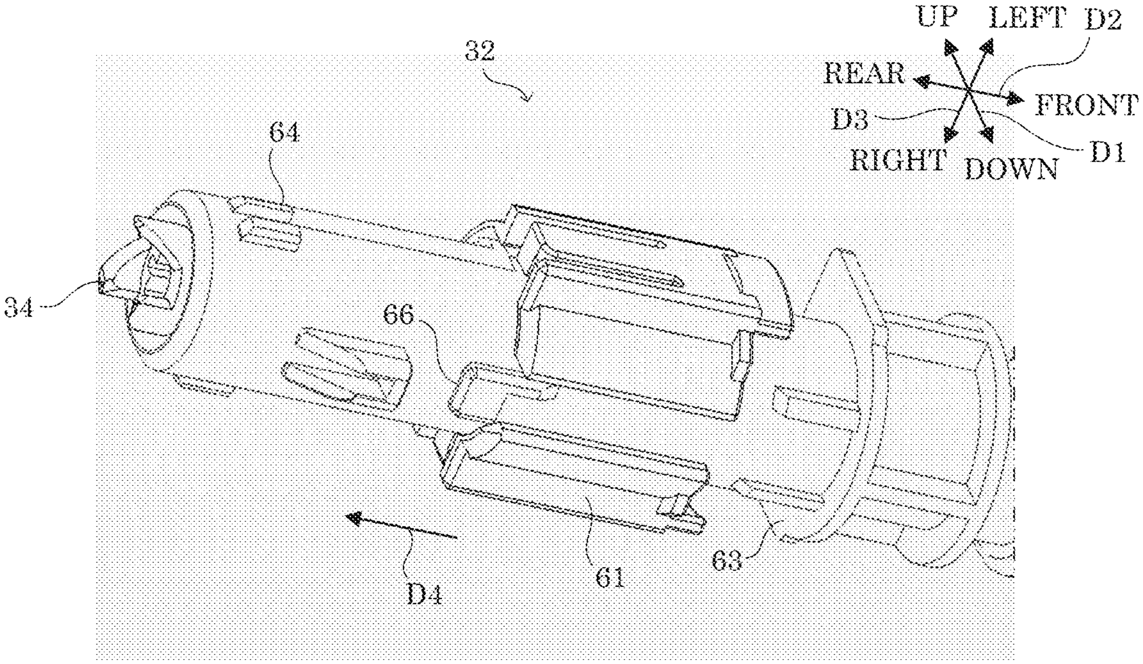
FIG. 10 is a diagram showing the configuration of the second storage portion of the waste toner container according to the embodiment of the present disclosure.
Figure 11:
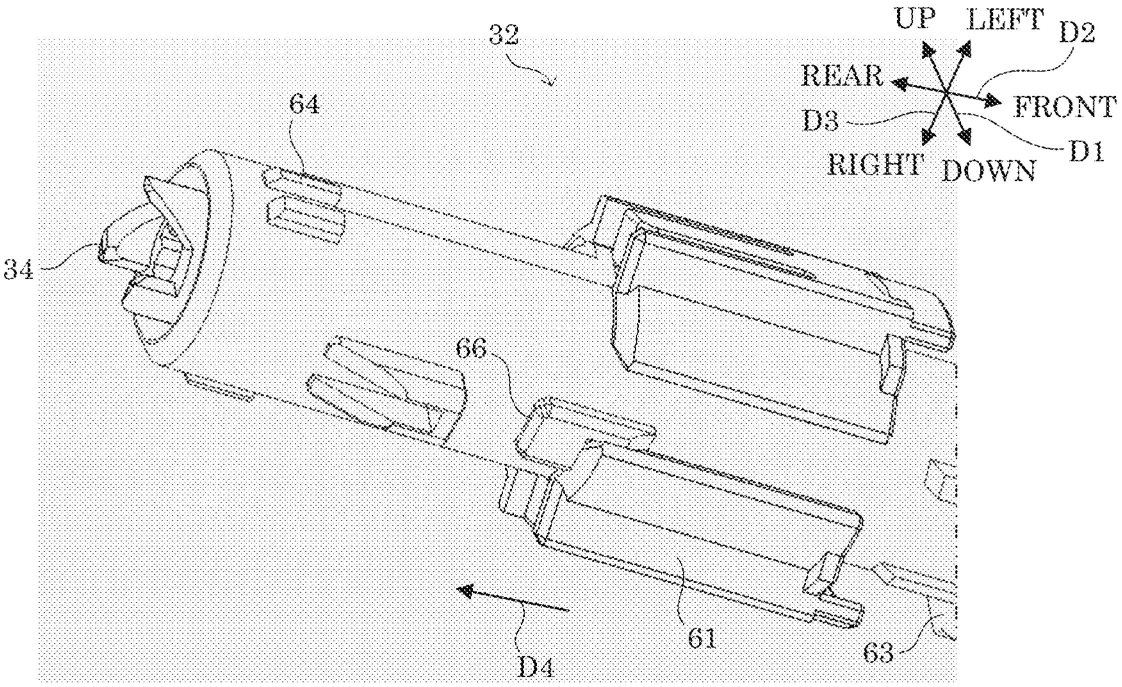
FIG. 11 is a diagram showing the configuration of the second storage portion of the waste toner container according to the embodiment of the present disclosure.

Next, a configuration of the second storage portion 32 will be described in more detail with reference to FIG. 2 and FIG. 8 to FIG. 11. Herein, FIG. 8 and FIG. 9 are each a perspective view showing a configuration of an upper portion of the second storage portion 32. In addition, FIG. 10 and FIG. 11 are each a perspective view showing a configuration of a bottom portion of the second storage portion 32. It is noted that in FIG. 9, the illustration of the sealing portion 65 is omitted. Moreover, in FIG. 10 and FIG. 11, the illustration of the compression coil spring 62 is omitted.

As shown in FIG. 2 and FIG. 8, the second storage portion 32 includes a shutter portion 61, the compression coil spring 62, a spring support portion 63, a third latch portion 64, and the sealing portion 65.

The shutter portion 61 is provided to be movable between a cover position (see FIG. 9) at which the opening portion 33 is covered on an outer side of the second storage portion 32 and an evacuation position (see FIG. 8) evacuated from the cover position toward the upstream side of the insertion direction D4.

Specifically, as shown in FIG. 8 to FIG. 11, the shutter portion 61 is a member having substantially a semicylindrical shape that is formed along the outer circumference of the second storage portion 32. In the second storage portion 32, the shutter portion 61 is provided to be movable between the cover position and the evacuation position along the insertion direction D4.

The compression coil spring 62 encloses the outer circumference of the second storage portion 32 at a position more on the upstream side of the insertion direction D4 than the shutter portion 61 and biases the shutter portion 61 in the insertion direction D4. The compression coil spring 62 extends and contracts in the insertion direction D4. An end portion of the compression coil spring 62 on the downstream side of the insertion direction D4 is in contact with the shutter portion 61. The compression coil spring 62 is an example of a bias portion according to the present disclosure. It is noted that the bias portion according to the present disclosure is not limited to the compression coil spring 62 and only needs to have a configuration capable of biasing the shutter portion 61 in the insertion direction D4.

The spring support portion 63 supports an end portion of the compression coil spring 62 on the upstream side of the insertion direction D4. As shown in FIG. 8 and FIG. 9, the spring support portion 63 is formed in a flat plate shape orthogonal to the insertion direction D4 at the outer circumferential portion of the second storage portion 32.

The third latch portion 64 comes into contact with the shutter portion 61 arranged at the cover position and latches a movement of the shutter portion 61 in the insertion direction D4. As shown in FIG. 8 and FIG. 9, the third latch portion 64 is provided at the outer circumferential portion of the second storage portion 32.

When the waste toner container 25 is inserted into the container attachment portion 26, the shutter portion 61 is moved from the cover position to the evacuation position. Specifically, the container attachment portion 26 is provided with a shutter latch portion (not shown) which comes into contact with the shutter portion 61 of the waste toner container 25 that moves inside the container attachment portion 26 in the insertion direction D4 to thus latch the movement of the shutter portion 61 in the insertion direction D4. By coming into contact with the shutter latch portion, the shutter portion 61 is moved toward the upstream side of the insertion direction D4 relative to the second storage portion 32. In other words, the shutter portion 61 is moved from the cover position to the evacuation position. Therefore, the opening portion 33 is opened in a state where the waste toner container 25 is attached to the container attachment portion 26. In addition, when the waste toner container 25 is drawn out from the container attachment portion 26, the contact state between the shutter portion 61 and the shutter latch portion is released. Therefore, the shutter portion 61 is moved from the evacuation position to the cover position.

The sealing portion 65 is provided along an edge portion of the opening portion 33 and fills a gap formed between the shutter portion 61 arranged at the cover position and the opening portion 33 (see FIG. 9). As shown in FIG. 8, the sealing portion 65 is a flat member formed with an opening of a size corresponding to the opening portion 33. The sealing portion 65 is formed by a member having elasticity. For example, the sealing portion 65 is formed of sponge or the like.

Incidentally, in the conventional waste toner container, the opening portion 33 is covered by the shutter portion 61, and thus it takes time and effort to perform the cleaning task of the opening portion 33.

In contrast, in the waste toner container 25 according to the embodiment of the present disclosure, the cleaning task before reuse can be facilitated as will be described below.

Specifically, the waste toner container 25 includes a lock portion 66 shown in FIG. 10 and FIG. 11.

The lock portion 66 locks the shutter portion 61 at the evacuation position.

Specifically, at the evacuation position, the shutter portion 61 is provided to be movable between an unlock position (see FIG. 10) at which the movement along the insertion direction D4 is allowed and a lock position (see FIG. 11) set apart from the unlock position along the outer circumference (the circumferential direction) of the second storage portion 32.

Further, the lock portion 66 comes into contact with the shutter portion 61 arranged at the lock position to latch the movement of the shutter portion 61 in the insertion direction D4. As shown in FIG. 10 and FIG. 11, the lock portion 66 is provided at the outer circumferential portion of the second storage portion 32. The lock position is a position at which the shutter portion 61 and the lock portion 66 oppose each other along the insertion direction D4.

By the lock portion 66, a state where the shutter portion 61 is opened with respect to the opening portion 33 is maintained. Therefore, the cleaning worker does not need to manually maintain the state where the shutter portion 61 is opened with respect to the opening portion 33 during the cleaning task of the opening portion 33. Accordingly, the cleaning task of the opening portion 33 by the cleaning worker is facilitated.

It is noted that the lock portion 66 may be a member that is provided to be movable between a position at which the lock portion 66 opposes the shutter portion 61 at a position more on the downstream side of the insertion direction D4 than the shutter portion 61 and a position evacuated from the opposing position, along the outer circumference (the circumferential direction) of the second storage portion 32. In this case, the shutter portion 61 does not need to be provided to be movable along the outer circumference (the circumferential direction) of the second storage portion 32.

Next, with reference to FIG. 12 to FIG. 15, a manufacturing method of a toner container according to the present disclosure will be described along with procedures for attaching the respective constituent members provided in the second storage portion 32.

A manufacturing worker who performs a manufacturing task of the waste toner container 25 executes a first step, a second step, a third step, and a fourth step to attach the respective constituent members provided in the second storage portion 32.

Figure 13:
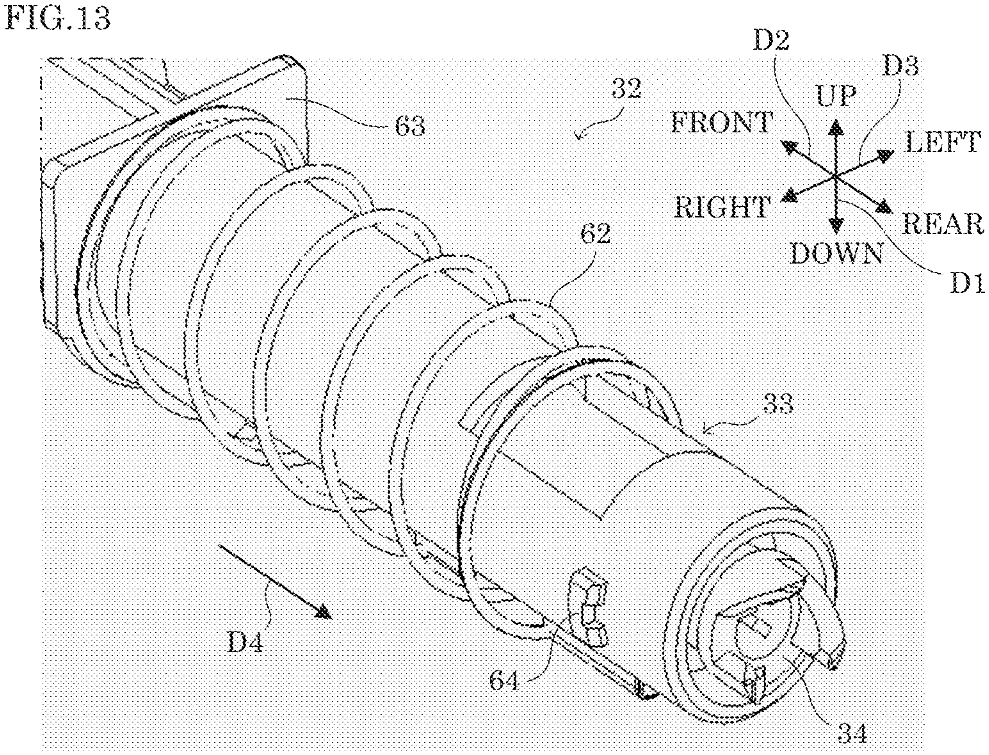
FIG. 13 is a diagram showing an incomplete state of the waste toner container according to the embodiment of the present disclosure.

Specifically, the first step is a step of attaching (inserting) the compression coil spring 62 to the second storage portion 32 as shown in FIG. 13.

Figure 14:
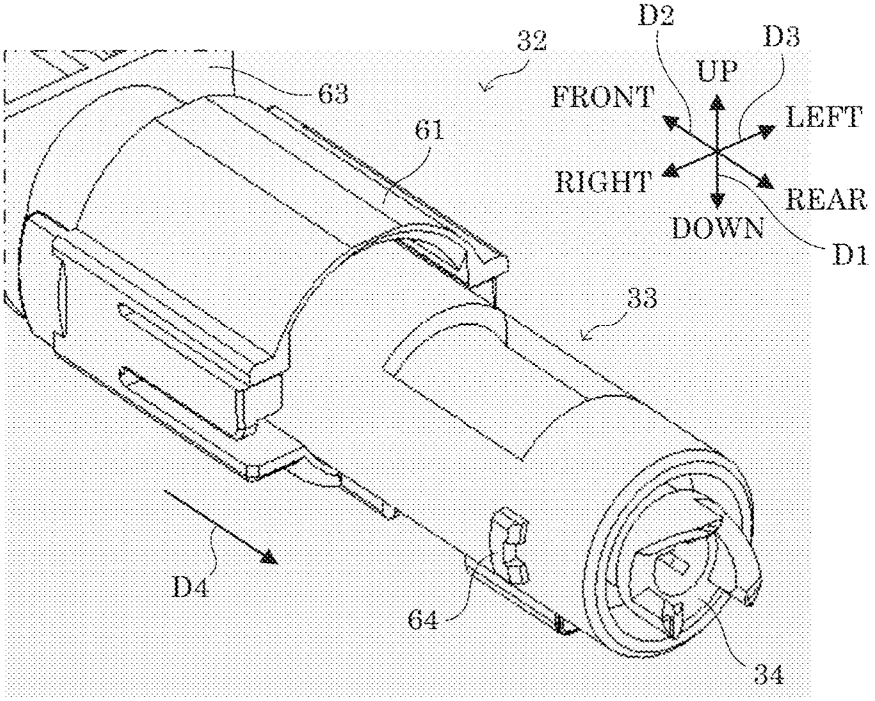
FIG. 14 is a diagram showing the incomplete state of the waste toner container according to the embodiment of the present disclosure.

Further, the second step is a step of attaching the shutter portion 61 after the first step as shown in FIG. 14. It is noted that in FIG. 14, the illustration of the compression coil spring 62 is omitted.

Furthermore, the third step is a step of locking the shutter portion 61 at the evacuation position using the lock portion 66.

Figure 15:
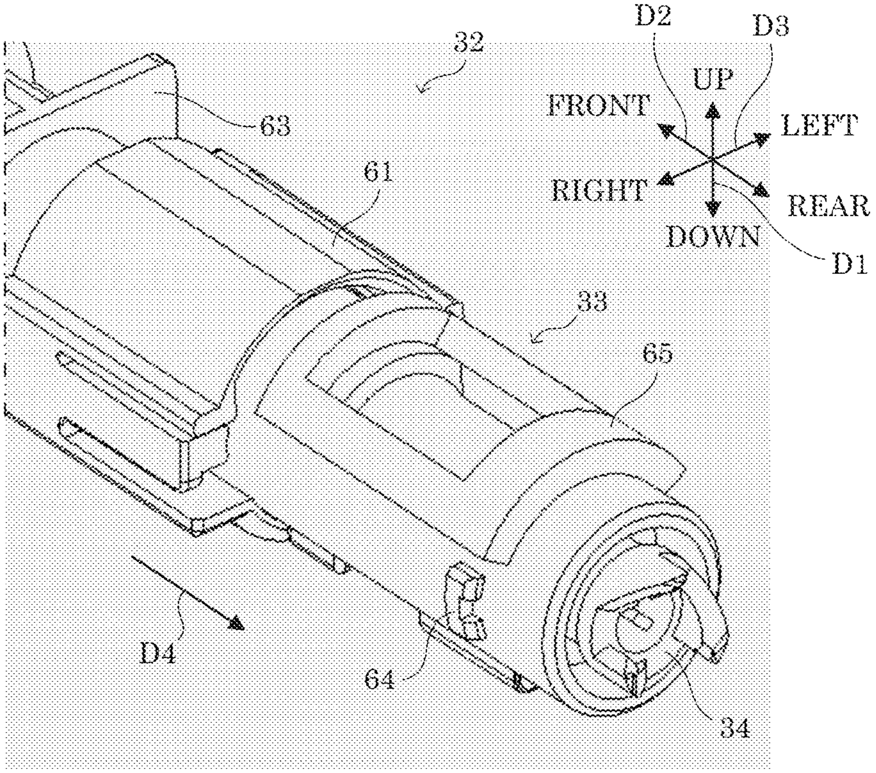
FIG. 15 is a diagram showing the incomplete state of the waste toner container according to the embodiment of the present disclosure.

In addition, the fourth step is a step of attaching the sealing portion 65 after the third step as shown in FIG. 15. It is noted that in FIG. 15, the illustration of the compression coil spring 62 is omitted.

Figure 12:
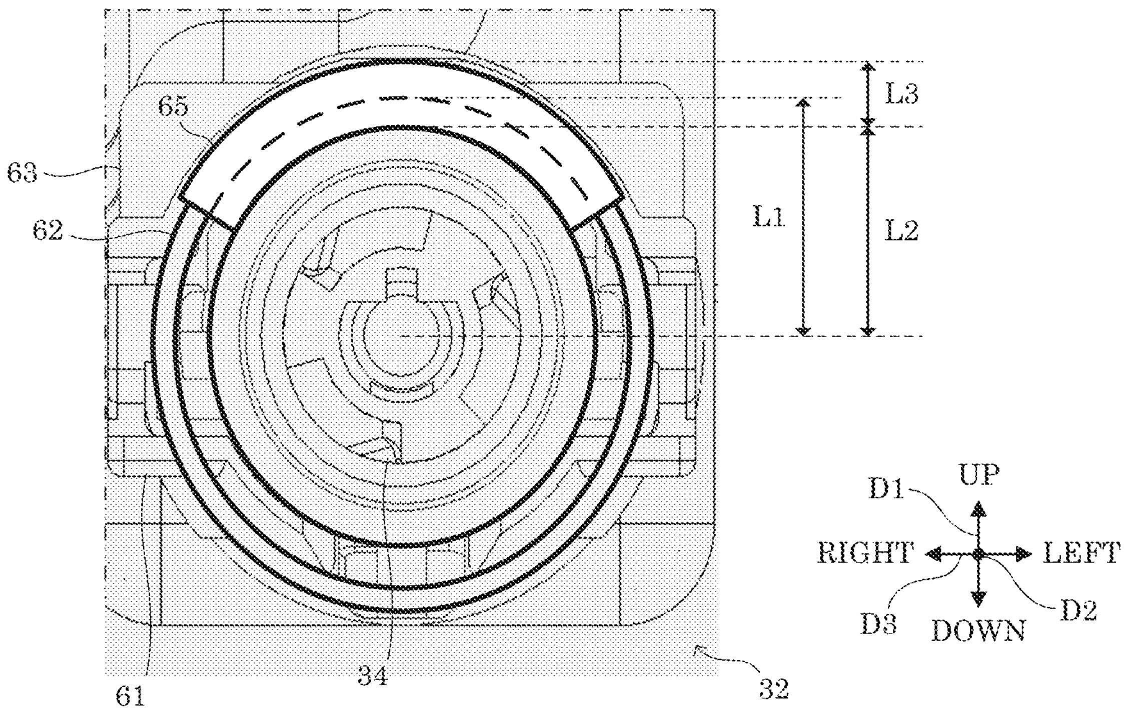
FIG. 12 is a diagram showing the configuration of the second storage portion of the waste toner container according to the embodiment of the present disclosure.

By attaching the respective constituent members provided in the second storage portion 32 by the procedures described above, an inner diameter of the compression coil spring 62 does not need to be made large so as not to inhibit the attachment of the compression coil spring 62 by the attached sealing portion 65 as compared to a case where the compression coil spring 62 and the shutter portion 61 are attached after the sealing portion 65 is attached. Therefore, as shown in FIG. 12, an inner diameter L1 of the compression coil spring 62 can be made to be smaller than a sum of an outer diameter L2 of the second storage portion 32 and a thickness L3 of the sealing portion 65.

In this manner, in the waste toner container 25, the second storage portion 32 is detachably provided with respect to the first storage portion 31. Thus, the cleaning worker can discharge the waste toner stored inside the second storage portion 32 from the opening end portion of the to-be-attached portion 51 and also discharge the waste toner stored inside the first storage portion 31 from the opening end portion of the protrusion portion 41. Accordingly, in the waste toner container 25, the waste toner can be removed in a shorter time than in the waste toner container according to the related art.

In addition, in the waste toner container 25, the shutter portion 61 is locked at the evacuation position by the lock portion 66. Thus, during the cleaning task of the opening portion 33, the cleaning worker does not need to manually maintain the state where the shutter portion 61 is opened with respect to the opening portion 33. Accordingly, the cleaning task of the waste toner container 25 before reuse can be facilitated.

It is noted that the present disclosure may also be applied to the toner container member 14A. In this case, the toner container member 14A is another example of the toner container according to the present disclosure. In addition, when the present disclosure is applied to the toner container member 14A, the first latch portion 53 only needs to latch the forward screwing of the second storage portion 32 with respect to the first storage portion 31 by the forward screwing amount with which the opening portion 33 faces downwardly in the vertical direction with respect to the first storage portion 31 in the insertion attitude.

NOTES OF DISCLOSURE

Hereinafter, a general outline of the disclosure extracted from the embodiment described above will be noted. It is noted that the respective configurations and processing functions described in the notes below can be sorted and arbitrarily combined as appropriate.

Note 1

A toner container, including: a cylindrical portion formed in a cylindrical shape elongated in an insertion direction with respect to an image forming apparatus; an opening portion provided at an outer circumferential portion of the cylindrical portion; a shutter portion provided to be movable between a cover position at which the shutter portion covers the opening portion on an outer side of the cylindrical portion and an evacuation position evacuated from the cover position toward an upstream side of the insertion direction; a bias portion which biases the shutter portion in the insertion direction; and a lock portion which locks the shutter portion at the evacuation position.

Note 2

The toner container according to Note 1, including: a sealing portion which is provided along an edge portion of the opening portion and fills a gap between the shutter portion arranged at the cover position and the opening portion.

Note 3

The toner container according to Note 1 or 2, in which at the evacuation position, the shutter portion is provided to be movable between an unlock position at which a movement along the insertion direction is allowed and a lock position set apart from the unlock position along an outer circumference of the cylindrical portion, and the lock portion comes into contact with the shutter portion arranged at the lock position to latch the movement of the shutter portion in the insertion direction.

Note 4

An image forming apparatus, including: the toner container according to any one of Notes 1 to 3.

Note 5

A manufacturing method of a toner container including a cylindrical portion formed in a cylindrical shape elongated in an insertion direction with respect to an image forming apparatus, an opening portion provided at an outer circumferential portion of the cylindrical portion, a shutter portion provided to be movable between a cover position at which the shutter portion covers the opening portion on an outer side of the cylindrical portion and an evacuation position evacuated from the cover position toward an upstream side of the insertion direction, a compression coil spring which encloses an outer circumference of the cylindrical portion at a position more on the upstream side of the insertion direction than the shutter portion and biases the shutter portion in the insertion direction, a lock portion which locks the shutter portion at the evacuation position, and a sealing portion which is provided along an edge portion of the opening portion and fills a gap between the shutter portion arranged at the cover position and the opening portion, the manufacturing method including: a first step of attaching the compression coil spring to the cylindrical portion; a second step of attaching the shutter portion after the first step; a third step of locking the shutter portion at the evacuation position using the lock portion; and a fourth step of attaching the sealing portion after the third step.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A toner container, comprising:

a cylindrical portion formed in a cylindrical shape elongated in an insertion direction with respect to an image forming apparatus;

an opening portion provided at an outer circumferential portion of the cylindrical portion;

a shutter portion provided to be movable between a cover position at which the shutter portion covers the opening portion on an outer side of the cylindrical portion and an evacuation position evacuated from the cover position toward an upstream side of the insertion direction;

a bias portion which biases the shutter portion in the insertion direction; and a lock portion which locks the shutter portion at the evacuation position, wherein the lock portion locks the shutter portion at the evacuation position in the toner container in a state of the toner container being removed from the image forming apparatus.

2. The toner container according to claim 1, comprising:

a sealing portion which is provided along an edge portion of the opening portion and fills a gap between the shutter portion arranged at the cover position and the opening portion.

3. The toner container according to claim 1, wherein at the evacuation position, the shutter portion is provided to be movable between an unlock position at which a movement along the insertion direction is allowed and a lock position set apart from the unlock position along an outer circumference of the cylindrical portion, and the lock portion comes into contact with the shutter portion arranged at the lock position to latch the movement of the shutter portion in the insertion direction.

4. An image forming apparatus, comprising:

the toner container according to claim 1.

5. A manufacturing method of a toner container including a cylindrical portion formed in a cylindrical shape elongated in an insertion direction with respect to an image forming apparatus, an opening portion provided at an outer circumferential portion of the cylindrical portion, a shutter portion provided to be movable between a cover position at which the shutter portion covers the opening portion on an outer side of the cylindrical portion and an evacuation position evacuated from the cover position toward an upstream side of the insertion direction, a compression coil spring which encloses an outer circumference of the cylindrical portion at a position more on the upstream side of the insertion direction than the shutter portion and biases the shutter portion in the insertion direction, a lock portion which locks the shutter portion at the evacuation position, and a sealing portion which is provided along an edge portion of the opening portion and fills a gap between the shutter portion arranged at the cover position and the opening portion, the manufacturing method comprising:

a first step of attaching the compression coil spring to the cylindrical portion;

a second step of attaching the shutter portion after the first step;

a third step of locking the shutter portion at the evacuation position using the lock portion; and a fourth step of attaching the sealing portion after the third step.

* * * * *